United States Patent
Singh et al.

(10) Patent No.: US 11,886,001 B2
(45) Date of Patent: Jan. 30, 2024

(54) OPTICAL WAVEGUIDE FABRICATION PROCESS

(71) Applicants: Amit Singh, Los Angeles, CA (US); David G. Fliszar, Manhattan Beach, CA (US)

(72) Inventors: Amit Singh, Los Angeles, CA (US); David G. Fliszar, Manhattan Beach, CA (US)

(73) Assignee: Snap Inc., Santa Monica, CA (US)

( * ) Notice: Subject to any disclaimer, the term of this patent is extended or adjusted under 35 U.S.C. 154(b) by 375 days.

(21) Appl. No.: 16/723,679

(22) Filed: Dec. 20, 2019

(65) Prior Publication Data

US 2021/0191037 A1    Jun. 24, 2021

(51) Int. Cl.
*G02B 6/10* (2006.01)

(52) U.S. Cl.
CPC ...................... *G02B 6/10* (2013.01)

(58) Field of Classification Search
CPC .................... G02B 6/10; G02B 6/13
See application file for complete search history.

(56) References Cited

U.S. PATENT DOCUMENTS

| | | | | | |
|---|---|---|---|---|---|
| 3,832,028 A | * | 8/1974 | Kapron | ........... | H04B 10/502 385/124 |
| 4,262,996 A | * | 4/1981 | Yao | ........... | G02B 6/124 385/37 |
| 4,367,916 A | * | 1/1983 | Mottier | ........... | G02B 6/1245 359/742 |
| 4,440,468 A | * | 4/1984 | Auracher | ........... | G02B 6/4215 359/566 |
| 4,746,770 A | * | 5/1988 | McAvinney | ........... | G06F 3/0421 250/221 |
| 4,916,308 A | * | 4/1990 | Meadows | ........... | G06F 3/0412 250/221 |

(Continued)

FOREIGN PATENT DOCUMENTS

| JP | 2002160932 A | 6/2002 |
|---|---|---|
| JP | 2008007360 A | 1/2008 |
| WO | 2008016618 A2 | 2/2008 |

OTHER PUBLICATIONS

Forsberg et al: "Integration of distributed Ge islands onto Si wafers by adhesive wafer bonding and low-temperature Ge exfoliation", 2015 28th IEEE International Conference On Micro Electro Mechanical Systems (MEMS), IEEE, Jan. 18, 2015 (Jan. 18, 2015), pp. 280-283, XP032740875, DOI: 10.1109/MEMSYS.2015.7050943 [retrieved on Feb. 26, 2015] figure 1.

(Continued)

*Primary Examiner* — Andrew Jordan
(74) *Attorney, Agent, or Firm* — Culhane Meadows PLLC; Stephen J. Weed

(57) ABSTRACT

Methods of fabricating a waveguide module are presented that include the steps of providing a glass substrate having first and second substantially planar parallel surfaces and comprising one or more cells in a first arrangement and singulating the glass substrate to produce one or more singulated cells. Singulated cells are treated with a chemical agent, laminated to a carrier substrate, processed, and delaminated from the carrier wafer and optionally subjected to further processing.

19 Claims, 3 Drawing Sheets

(56) References Cited

U.S. PATENT DOCUMENTS

| | | | | |
|---|---|---|---|---|
| 5,043,573 A * | 8/1991 | Banks | H01L 27/1443 | 257/E27.128 |
| 5,136,682 A * | 8/1992 | Moyer | G02B 6/138 | 385/141 |
| 5,332,690 A * | 7/1994 | Cho | G02B 27/09 | 438/31 |
| 5,414,413 A * | 5/1995 | Tamaru | G06F 3/0421 | 345/173 |
| 5,432,877 A * | 7/1995 | Sun | G02B 6/421 | 385/33 |
| 5,480,764 A * | 1/1996 | Gal | G02B 3/0056 | 385/132 |
| 5,540,612 A * | 7/1996 | Mendez | A63H 3/38 | 623/4.1 |
| 5,604,835 A * | 2/1997 | Nakamura | G02B 6/12004 | 385/132 |
| 5,719,973 A * | 2/1998 | Monroe | G02B 6/0281 | 385/33 |
| 5,766,673 A * | 6/1998 | Nogami | C09D 183/08 | 106/287.34 |
| 5,850,498 A * | 12/1998 | Shacklette | G02B 6/30 | 385/129 |
| 5,914,709 A * | 6/1999 | Graham | G02B 6/32 | 345/173 |
| 6,181,842 B1 * | 1/2001 | Francis | G06F 3/0421 | 385/14 |
| 6,319,754 B1 * | 11/2001 | Wang | H01L 24/29 | 438/464 |
| 6,341,189 B1 * | 1/2002 | Deacon | H01S 5/026 | 385/130 |
| 6,351,260 B1 * | 2/2002 | Graham | G02B 6/32 | 345/173 |
| 6,456,766 B1 * | 9/2002 | Shaw | G02B 6/423 | 385/47 |
| 6,470,130 B1 * | 10/2002 | Walker | G02B 6/122 | 385/144 |
| 6,491,443 B1 * | 12/2002 | Serizawa | G02B 6/4292 | 385/33 |
| 6,538,644 B1 * | 3/2003 | Muraoka | G06F 3/0421 | 345/173 |
| 6,555,288 B1 * | 4/2003 | Xu | G02B 6/13 | 430/281.1 |
| 6,767,606 B2 * | 7/2004 | Jackson | B32B 3/28 | 428/116 |
| 6,790,402 B2 * | 9/2004 | Greven | B29C 69/001 | 428/116 |
| 6,810,160 B2 * | 10/2004 | Sugama | G02B 6/1221 | 385/33 |
| 6,858,518 B2 * | 2/2005 | Kondo | H01L 24/24 | 438/455 |
| 6,950,155 B2 * | 9/2005 | Umemoto | G02B 6/0038 | 349/138 |
| 7,099,553 B1 * | 8/2006 | Graham | G02B 6/0038 | 345/175 |
| 7,163,598 B2 * | 1/2007 | Okubora | G02B 6/13 | 385/147 |
| 7,203,002 B2 * | 4/2007 | Saiki | G02B 5/3033 | 359/487.04 |
| 7,298,941 B2 * | 11/2007 | Palen | G02B 6/423 | 264/1.24 |
| 7,306,689 B2 * | 12/2007 | Okubora | G02B 6/13 | 156/239 |
| 7,477,816 B2 * | 1/2009 | Juni | G02B 6/322 | 385/38 |
| 7,502,081 B2 * | 3/2009 | Umemoto | G02F 1/133615 | 349/63 |
| 7,649,209 B2 * | 1/2010 | Hussell | H01L 33/502 | 257/E33.061 |
| 7,684,663 B2 * | 3/2010 | Deane | H05K 1/0274 | 385/129 |
| 7,695,652 B2 * | 4/2010 | Fujii | G02B 6/138 | 438/33 |
| 7,801,399 B2 * | 9/2010 | Yamamoto | B32B 37/02 | 156/247 |
| 7,907,805 B2 * | 3/2011 | Juni | G06F 3/0421 | 385/33 |
| 7,921,674 B2 * | 4/2011 | Kim | G02B 6/13 | 65/378 |
| 7,941,017 B2 * | 5/2011 | Juni | G02B 6/1245 | 385/33 |
| 8,362,512 B2 * | 1/2013 | Hussell | G02B 6/0073 | 345/82 |
| 8,390,022 B2 * | 3/2013 | Hussell | H01L 33/502 | 257/E33.059 |
| 8,487,337 B2 * | 7/2013 | Hussell | C09K 11/7731 | 257/E33.059 |
| 8,635,887 B2 * | 1/2014 | Black | B23K 26/0626 | 219/121.72 |
| 8,720,228 B2 * | 5/2014 | Li | C03B 33/091 | 65/56 |
| 8,917,447 B2 * | 12/2014 | Wolk | G02B 6/0065 | 359/452 |
| 9,182,548 B2 * | 11/2015 | Takase | G02B 6/1221 | |
| 10,302,868 B2 * | 5/2019 | Horibe | G02B 6/30 | |
| 10,317,625 B2 * | 6/2019 | Horibe | C09J 7/22 | |
| 10,746,921 B2 * | 8/2020 | Bian | G02B 6/107 | |
| 10,877,216 B2 * | 12/2020 | Choraku | G02B 6/4214 | |
| 11,054,574 B2 * | 7/2021 | Brusberg | B23K 26/53 | |
| 11,287,162 B2 * | 3/2022 | Lunt | H01L 31/055 | |
| 11,428,877 B2 * | 8/2022 | Cho | H01L 31/035272 | |
| 2002/0005922 A1 * | 1/2002 | Umemoto | G02F 1/133615 | 349/65 |
| 2002/0030668 A1 * | 3/2002 | Hoshino | G06F 3/0338 | 345/175 |
| 2002/0039155 A1 * | 4/2002 | Umemoto | G02F 1/133615 | 349/61 |
| 2002/0118907 A1 * | 8/2002 | Sugama | G02B 6/43 | 385/129 |
| 2003/0035632 A1 * | 2/2003 | Glebov | G02F 1/31 | 385/21 |
| 2003/0174943 A1 * | 9/2003 | Caracci | G02B 6/262 | 385/33 |
| 2003/0203315 A1 * | 10/2003 | Farahi | G02B 6/43 | 430/296 |
| 2003/0231851 A1 * | 12/2003 | Rantala | G02B 6/1221 | 385/141 |
| 2004/0001169 A1 * | 1/2004 | Saiki | G02B 6/0038 | 349/96 |
| 2004/0017974 A1 * | 1/2004 | Balch | G02B 6/4228 | 385/50 |
| 2004/0021579 A1 * | 2/2004 | Oursler | G08G 1/02 | 340/870.07 |
| 2004/0022487 A1 * | 2/2004 | Nagasaka | G02B 6/4204 | 385/31 |
| 2004/0076382 A1 * | 4/2004 | Saia | G02B 6/138 | 385/92 |
| 2004/0120667 A1 * | 6/2004 | Aylward | G02B 6/08 | 385/115 |
| 2004/0184702 A1 * | 9/2004 | Hayamizu | G02B 6/138 | 385/14 |
| 2004/0247236 A1 * | 12/2004 | Yoshimura | G02B 6/43 | 385/16 |
| 2005/0094914 A1 * | 5/2005 | Gines | B82Y 20/00 | 385/1 |
| 2005/0201681 A1 * | 9/2005 | Payne | G02B 6/125 | 385/38 |
| 2005/0271319 A1 * | 12/2005 | Graham | G02B 6/43 | 264/1.32 |
| 2005/0271983 A1 * | 12/2005 | Payne | G02B 6/1228 | 355/18 |
| 2006/0001653 A1 * | 1/2006 | Smits | G06F 3/0421 | 345/176 |
| 2006/0002655 A1 * | 1/2006 | Smits | G02B 6/136 | 385/39 |
| 2006/0088244 A1 * | 4/2006 | Kukulj | G02B 6/32 | 385/33 |
| 2006/0188196 A1 * | 8/2006 | Charters | G06F 3/0421 | 385/32 |

(56) References Cited

U.S. PATENT DOCUMENTS

| | | | | |
|---|---|---|---|---|
| 2006/0239605 | A1* | 10/2006 | Palen | G02B 6/423 385/33 |
| 2007/0025678 | A1* | 2/2007 | Kushibiki | C08L 83/04 385/141 |
| 2007/0114684 | A1* | 5/2007 | Ohtsu | G02B 6/138 264/1.24 |
| 2007/0237478 | A1* | 10/2007 | D'Aguanno | G02B 6/02295 385/129 |
| 2007/0262339 | A1* | 11/2007 | Hussell | C09K 11/7731 257/E33.059 |
| 2008/0031584 | A1 | 2/2008 | Payne | |
| 2009/0103873 | A1 | 4/2009 | Fujii et al. | |
| 2010/0035052 | A1* | 2/2010 | Farah | H01L 31/0392 216/33 |
| 2010/0090233 | A1* | 4/2010 | Hussell | G02B 6/0073 257/E33.059 |
| 2011/0164435 | A1* | 7/2011 | Hussell | C09K 11/7731 257/E33.056 |
| 2011/0170184 | A1* | 7/2011 | Wolk | G02B 6/0065 359/625 |
| 2012/0104428 | A1* | 5/2012 | Hussell | G02B 6/0023 257/E33.068 |
| 2019/0011703 | A1* | 1/2019 | Robaina | A61B 90/37 |
| 2019/0226720 | A1* | 7/2019 | Lunt | H01L 31/055 |
| 2020/0363583 | A1* | 11/2020 | Brusberg | G02B 6/10 |
| 2021/0096298 | A1* | 4/2021 | Wang | G02B 6/122 |
| 2021/0191037 | A1* | 6/2021 | Singh | G02B 6/10 |
| 2021/0389526 | A1* | 12/2021 | Kuo | G02B 6/124 |
| 2022/0080529 | A1* | 3/2022 | Nagaraj | C03B 33/0222 |
| 2023/0037929 | A1* | 2/2023 | Lane | G02B 6/0076 |

OTHER PUBLICATIONS

Fredrik Forsberg et al.: "Batch Transfer of Radially Expanded Die Arrays for Heterogeneous Integration Using Different Wafer Sizes", Journal of Microelectromechanical Systems, IEEE Service Center, US, vol. 21, No. 5, Oct. 1, 2012 (Oct. 1, 2012), pp. 1077-1083, XP011466130, ISSN: 1057-7157, DOI: 10.1109/JMEMS.2012. 2203105 figure 3.

International Search Report and Written Opinion for International Application No. PCT/US2020/061438, dated Feb. 11, 2021 (Nov. 2, 2021)—15pages.

Chinese Office action for Chinese Patent Application No. 202080088713.1 dated Aug. 24, 2023, 7 pages (English Summary—2 pages).

* cited by examiner

OPTICAL WAVEGUIDE FABRICATION PROCESS

TECHNICAL FIELD

Examples set forth in the present disclosure relate to fabrication processes, including processes for fabricating optical waveguides. More particularly, but not by way of limitation, the present disclosure describes methods for strengthening and processing substrates for optical waveguides.

BACKGROUND

Optical waveguides are structures that guide electromagnetic waves in the optical spectrum. Photonic devices utilize optical waveguides to guide, couple, switch, split, multiplex, and demultiplex optical signals. Optical waveguides may be fabricated by various methods.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Various implementations and details are described with reference to examples. These examples include methods of fabricating a waveguide module by providing a substrate having cells in a defined arrangement and singulating the cells of the substrate to produce singulated cells. The singulated cells are treated with an agent to strengthen the cells to produce treated singulated cells, which are laminated to a carrier substrate, processed, and delaminated from the carrier wafer and optionally subjected to further processing.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1:
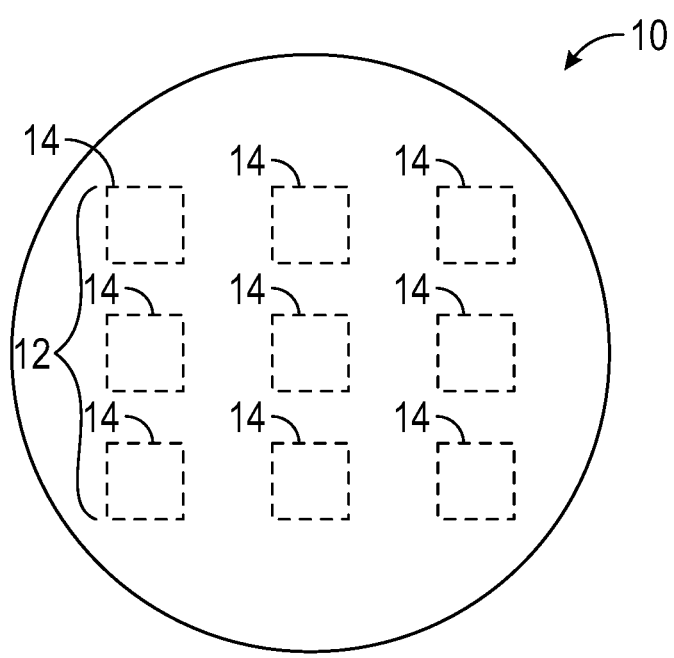
FIG. 1 is a schematic diagram of an exemplary substrate.

FIG. 1 is a top plan view of a substrate 10 showing a desired first arrangement 12 of cells 14 from which the substrate 10 may be cut. In some examples, suitable substrates include any optically transparent material including non-crystalline amorphic material such as glass, crystalline (e.g., sapphire), polycrystalline ceramic (e.g., spinel and zirconia) plastic, polymer, dielectric, metal oxide, metal nitride materials, and the like.

In some examples where the substrate material is a glass, it may comprise alumina, BK7, borosilicate, ceramic, copper, fused silica, gallium arsenide, gallium phosphide, germanium, glass-ceramic, indium phosphide, lithium niobate, polyethylene, Pyrex, quartz (fused silica), quartz (single crystal), sapphire, silicon, silicon carbide, silicon germanium, silicon on insulator, silicon on sapphire, or a combination thereof. In some examples, the substrate has a refractive index ranging from about 1.5 to about 2.2. In some aspects, the refractive index ranges from about 1.5 to about 1.7. In some examples, the refractive index is about 1.5, about 1.6, about 1.7, about 1.8, about 1.9, about 2.0, about 2.1, or about 2.2.

The substrate may have a thickness of less than or equal to about 3 mm, for example, ranging from about 0.1 mm to about 2.5 mm, from about 0.3 mm to about 2 mm, from about 0.7 mm to about 1.5 mm, or from about 1 mm to about 1.2 mm, including all ranges and subranges therebetween. The substrate can, in some examples, comprise a glass sheet having a first surface and an opposing second surface. The surfaces may, in certain examples, be planar or substantially planar, e.g., substantially flat and/or level. The substrate can also, in some examples, be curved about at least one radius of curvature, e.g., a three-dimensional substrate, such as a convex or concave substrate. The first and second surfaces may, in various examples, be parallel or substantially parallel. The substrate may further comprise at least one edge, for instance, at least two edges, at least three edges, or at least four edges. By way of a non-limiting example, the substrate may comprise a rectangular or square sheet having four edges, although other shapes and configurations are envisioned and are intended to fall within the scope of the disclosure.

FIGS. 2A-2E depicts in schematic and cross-sectional views one process by which waveguide modules may be fabricated showing various components involved in the process, such as the substrate, singulated individual cells, singulated treated individual cells laminated to a carrier substrate for processing, and delaminated processed cells, and their relationships to each other. FIG. 3 is a flow diagram showing an exemplary method 300 of fabricating a waveguide module.

Figure 2A:
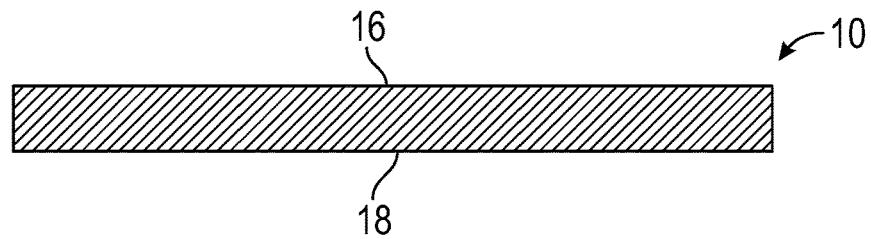
FIG. 2A is a sectional view of the substrate of FIG. 1.
Figure 2B:
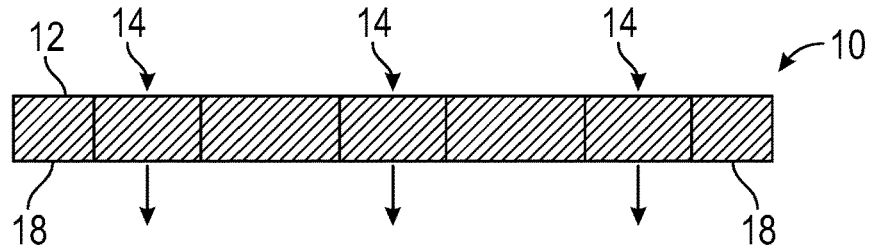
FIG. 2B is a sectional view of the exemplary substrate showing a first arrangement of cells.
Figure 2C:
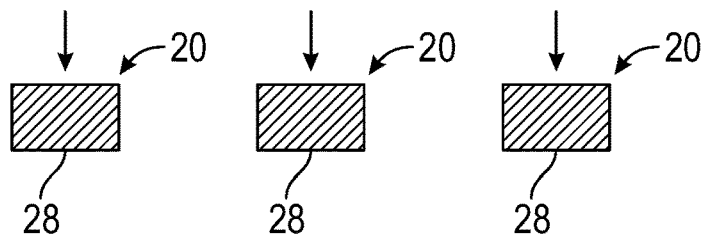
FIG. 2C is a sectional view of the individual cells after singulation.
Figure 3:
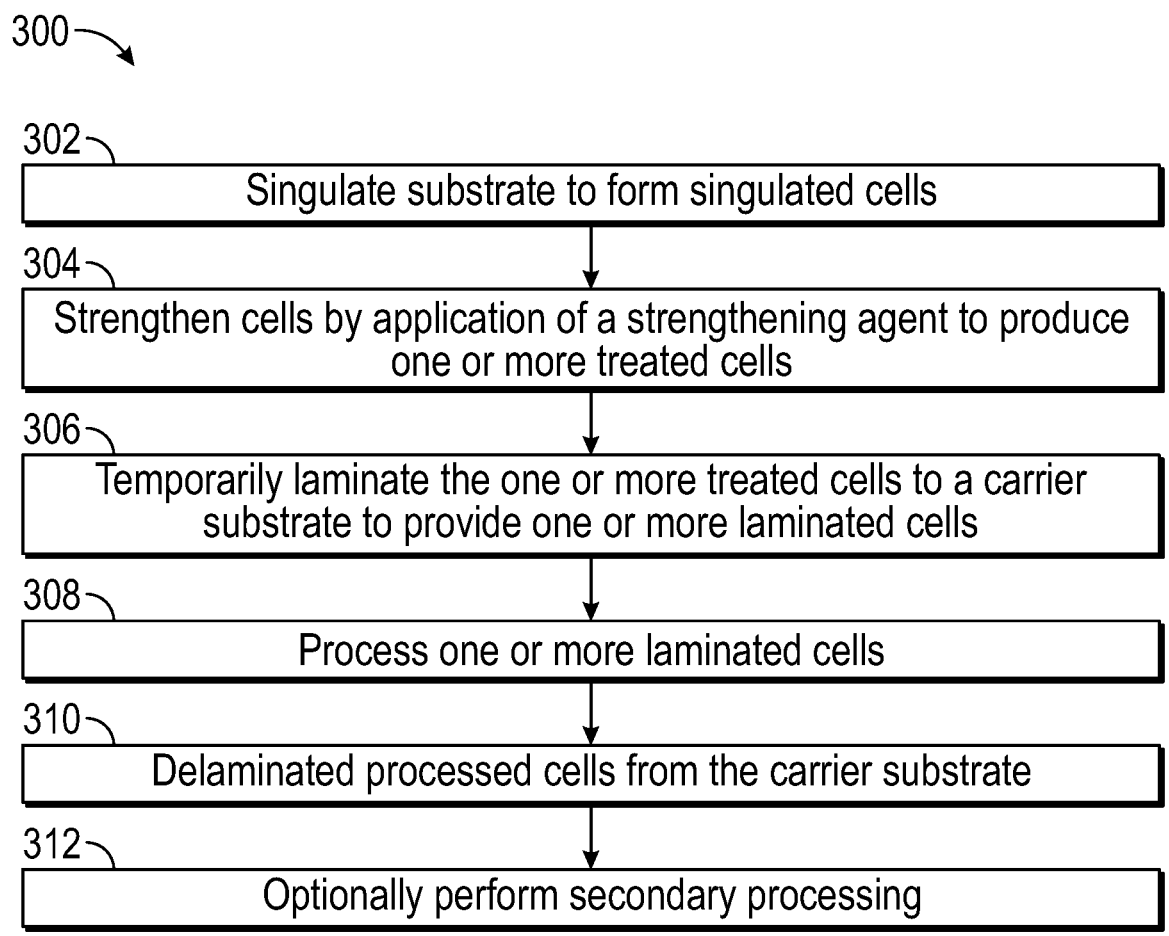
FIG. 3 is a flow diagram illustrating an example method consistent with the present disclosure.

Referring to FIG. 2A, substrate 10 has a first surface 16 and a second surface 18 and a thickness extending therebetween through which the substrate 10 may be singulated along predetermined boundaries 14 (shown collectively as first arrangement 12) in FIG. 1, and in cross-section in FIG. 2B, and the resulting singulated cells 20 in FIG. 2C.

At operation 302 of FIG. 3, substrate singulation is the process by which cells are separated from a substrate (or wafer) into one or more cells. Various methods are used for singulating substrate including, e.g., mechanical sawing, etching, laser dicing, stealth laser dicing, plasma, or the like. Techniques that reduce or minimize the needed spacing regions while also avoiding or reducing damage to the substrates may be desirable. Some singulation methods can cause damage to a substrate, especially thin substrates, and such damage, as among other things, sidewall chipping.

During singulation, substrates are typically mounted on dicing tape which has a adhesive backing that holds the wafer on a thin sheet metal frame. Singulation tape has different properties depending on the singulating application. UV curable tapes are used for smaller sizes and non-UV tape for larger singulated cell sizes. The size of each singulated cell may range from 0.1 to 35 mm square, and while the cells created may be any shape generated by straight lines, and are typically rectangular or square, they can be other shapes depending on the singulation method used. A full-cut laser has the ability to singulate and separate in a variety of shapes. In a dicing before grinding (DBG) singulation process, substrates may be processed in a preliminary step so that material is removed from kerf regions (sawed, etched, etc.) from a front side, for example, at least up to the depth of a required chip thickness. Subsequently, such substrates may be diced from the back side by means of a grinding process.

At operation 304 of FIG. 3, singulated cells (see FIG. 2C) are strengthened with an agent to provide treated cells. As used herein, the term "treated cells" refer to singulated cells that have been strengthened. In contrast, "untreated cells" as used herein refer to singulated cells that have not been exposed to a strengthening agent. Singulated cells may be treated through various methods. In some examples, singulated cells may be chemically treated. One example of chemical treatment includes methods using ion-exchange of larger ions for smaller ions in the surface of the substrate. In one method of chemically strengthening singulated cells, the cells can be immersed in a bath contain a potassium salt (e.g., potassium nitrate) at a high temperature (e.g., about 300° C.). The substrate may be pre-treated by immersion in a sodium nitrate bath between about 425 and about 475° C. to enrich the surface with sodium ions prior to submerging the substrate in the potassium salt bath, which provides more sodium ions for subsequent replacement by potassium ions. Other replacement ions may be used where other ions besides sodium are the targeted ions for replacement. In other aspects, application of electrical field-, sonication-, or microwave-assisted ion exchange may be used prior to and/or during the chemical treatment process.

Singulated cells strengthened chemically, i.e., treated cells, in some examples are resistant to compressive stress of at least about 750 MPa, at least about 775 MPa, at least about 800 MPa, at least about 825 MPa, at least about 850 MPa, at least about 875 MPa, and/or at least about 880 MPa.

Depth of Compressive Stress Layer (DOL) is a measurement of the compressive strength of glass specific to chemically strengthened glass and measures the depth into the surface of glass to which compressive stress is introduced. It is defined as the distance from the physical surface to the zero stress point internal to the glass. In accordance with some examples, the DOL of treated cells is greater than 50 µm. In accordance with some other examples, the DOL of treated cells ranges from about 50 µm to about 150 µm, from about 50 µm to about 75 µm, from about 75 µm to about 100 µm, from about 100 µm to about 125 µm, and from about 125 µm to about 150 µm. In some aspects, the DOL of treated cells is greater than about 75 µm, about 80 µm, about 85 µm, about 90 µm, about 95 µm, about 100 µm, about 105 µm, about 110 µm, about 115 µm, about 120 µm, about 125 µm, about 130 µm, about 135 µm, about 140 µm, about 145 µm and about 150 µm.

In other examples, other strengthening methods can be used, such as heat strengthening, heat tempering, or utilizing a mismatch of the coefficient of thermal expansion between portions of the substrate to create compressive stress and central tension regions to form strengthened substrates.

In assessing the strengthening levels of treated cells, the primary methods of measurements are impact testing, Modulus of Rupture (MOR), Knoop Hardness Number (KHN), and Young's Modulus (E). MOR measures the flexural strength of singulated treated cells, and is determined by specific tests conducted in accordance with ASTM-C-58 where the substrate material is glass.

In some examples, one or more treated cells or a batch of cells has an average difference in the value of a measure (e.g., impact testing, MOR, KHN, Young's Modulus, and/or DOL) reflecting greater strength of at least 0.3% compared to an equal number of untreated cells. In one aspect, the sample comprises at least one batch. In another aspect, the sample comprises five or more batches. In some aspects, a batch comprises at least 10 treated cells. In accordance with some examples, treated cells have a MOR greater than 900 Mpa.

In accordance with some examples, the treated cells has a Young's modulus E (kN/mm2) that ranges from about 60 to about 90, from about 60 to about 70, from about 70 to about 80, and from about 80 to about 90. In other aspects, the Young's modulus E of the treated cells ranges from about 60 to about 65, from about 65 to about 70, from about 70 to about 75, from about 75 to about 80, and from about 85 to about 90.

In accordance with some examples, the KHN (HK=0.1/20) is at least 400 and ranges from about 400 to about 550, from about 400 to about 425, from about 425 to about 450, from about 450 to about 475, from about 475 to about 500, and from about 500 to about 525. In some aspects, the KHN is increased in the range of from about 1% to about 20%, from about 1% to about 5%, from 1% to about 10%, and from about 1% to about 15%. In some aspects, the KHN is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%.

Figure 2D:
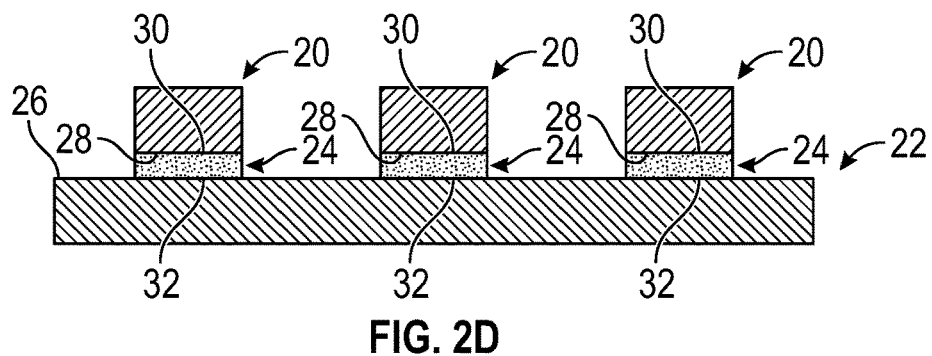
FIG. 2D is a sectional view of the individual cells of FIG. 2C laminated to an exemplary carrier substrate.

At step 306 of FIG. 3, one or more treated cells are temporarily and releasably laminated to predetermined sites on a surface of a carrier substrate 22, as shown in FIG. 2D, by a laminate layer 24 substantially corresponding to the first arrangement 12 to provide one or more laminated cells. In particular, laminate layer 24 is adhered to top surface 26 of carrier substrate 22 and bottom surface 28 of treated cells. Laminate layer has first and second surfaces 30, 32.

Application of the laminate material can be carried out by suitable means, including spin coating, casting from solution, ink jetting, and spray coating. In one example, the laminate layer is applied at a thickness of from about 5 µm to about 100 µm, about 5 µm to about 50 µm, and about 10 µm to about 30 µm.

The laminate layer 24 is typically formed of a material comprising monomers, oligomers, and/or polymers dispersed or dissolved in a solvent system. If the fill layer will be applied via spin coating, it is preferred that the solids content of this material be from about 1% by weight to about 50% by weight, more preferably from about 5% by weight to about 40% by weight, and even more preferably from about 10% by weight to about 30% by weight. Examples of suitable monomers, oligomers, and/or polymers include cyclic olefin polymers and copolymers and amorphous fluoropolymers with high atomic fluorine content (greater than about 30% by weight) such as fluorinated siloxane polymers, fluorinated ethylene-propylene copolymers, polymers with pendant perfluoroalkoxy groups, and copolymers of tetrafluoroethylene and 2,2-bis-trifluoromethyl-4,5-difluoro-1,3-dioxole. It will be appreciated that the bonding strength of these materials will depend upon their specific chemical structures and the coating and baking conditions used to apply them.

In another example, the laminate layer 24 could also be formed of a polymeric material that contains dispersed nanoparticles. Suitable nanoparticle materials include those selected from the group consisting of alumina, ceria, silica, zirconia, graphite, and mixtures thereof.

The laminate material should remain stable at temperatures of from about 150° C. to about 350° C. Furthermore, this material should be stable under the chemical exposure conditions encountered in the particular backside processes to which they will be subjected. The laminate layer should not decompose (i.e., less than about 1% weight loss) or otherwise lose its mechanical integrity, for example, by melting, under these conditions.

In this example, the laminate layer 24 preferably does not form strong adhesive bonds (i.e., low bonding strength) in order to permit subsequent release from the carrier substrate 22. Thus, anything with an adhesion strength of less than about 50 psig, preferably from less than about 35 psig, and more preferably from about 1 psig to about 30 psig would be desirable for use as laminate layer. As used herein, adhesion strength is determined by ASTM D4541/D7234.

The laminate layer 24 can include resins such as synthetic resins such as olefin copolymers (e.g., methylpentene copolymers), cycloolefin copolymers (e.g., norbornene copolymers, dicyclopentadiene copolymers, tetracyclododecene copolymers), novolac resins, phenolic resins, epoxy resins, melamine resins, urea resins, unsaturated polyester resins, alkyd resins, polyurethane resins, solvent-soluble polyimide resins, polyethylene resins, polypropylene resins, polyvinyl chloride resins, polyvinyl acetate resins, PTFE resins, PFA resins, FEP resins, ethylene-TFE copolymer resins, PVDF resins, PCTFE resins, ethylene-CTFE resins, TFE-perfluorodimethyldioxole copolymer resins, PVF resins, ABS resins, AS resins, acrylic resins, cellulose resins, polyamides, polyacetals, polycarbonates, polyphenylene ethers, polybutylene terephthalates, polyethylene terephthalates, cyclic polyolefins, polyphenylene sulfides, polysulfones, polyether sulfone resins, polybenzimidazole resins, polyarylateresins, and polyether ketone resins; and natural resins such as natural rubbers. Among others, preferred are PTFE resins, PFA resins, FEP resins, ethylene-TFE copolymer resins, PVDF resins, PCTFE resins, ethylene-CTFE resins, TFE-perfluorodimethyldioxole copolymer resins, PVF resins, polyether sulfone resins, solvent-soluble polyimide resins, polyester resins, polybenzimidazole resins, polyphenylene ether resins, and polyether ketone resins, more preferably PFA resins, TFE-perfluorodimethyldioxole copolymer resins, PVF resins, polyether sulfone resins, solvent-soluble polyimide resins, polyester resins, polybenzimidazole resins, polyphenylene ether resins and polyether ketone resins, especially preferably polyether sulfone resins, solvent-soluble polyimide resins, polyester resins, polybenzimidazole resins, polyphenylene ether resins, and polyether ketone resins.

In accordance with various examples, the carrier substrate 22 as well as any other carrier described herein may be made out of any suitable material, and may be configured as rigid carrier. For example, the carrier substrate 22 may be can be made out of materials including silicon (e.g., a blank device wafer), glass, graphite, acrylic glass (Polymethylmethacrylate; PMMA), ceramics, various metals, and plastic. The carrier substrate may be square or rectangular but are more commonly round and are sized to match the waveguide module and at a minimum to receive singulated cells in an arrangement corresponding to the first arrangement 12.

Figure 2E:
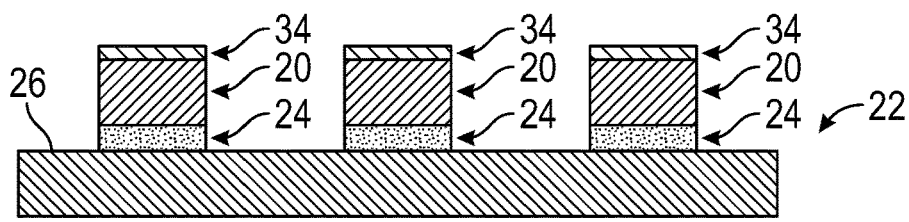
FIG. 2E is a sectional view of processed cells in accordance with various examples.

At operation 308 of FIG. 3, the laminated cells can undergo additional processing, such as the deposition of a second layer 34 (e.g., a waveguide layer) on one or more laminated cells, as shown in FIG. 2E. The waveguide layer is also fabricated from an optically transparent material. For example, a spin-on-glass material or a sol-gel material can be utilized to fabricate a waveguide layer and material may be selected that has a second refractive index. In one example, the material utilized for a waveguide layer may be selected such that the second refractive index substantially matches the first refractive index of the substrate material. By utilizing materials having a refractive index of between about 1.5 and about 2.2 compared to the refractive index of air (1.0), total internal reflection, or at least a high degree thereof, is achieved to facilitate light propagation. In some examples, the material of the waveguide layer has a second refractive index of at least about 1.5, and ranging from about 1.5 to about 2.2, and from about 1.5 to about 1.7. In accordance with some examples, the second refractive index is about 1.5, about 1.6, about 1.7, about 1.8, about 1.9, about 2.0, about 2.1, or about 2.2. By matching the refractive indices of the materials utilized to fabricate the substrate and the waveguide layer, light propagation through both the substrate and waveguide layer may be achieved without substantial light refraction at an interface between the substrate and the waveguide layer.

After deposition of the second layer, the second layer 34 (e.g., a waveguide layer) can be patterned by various processes such as nanoimprint lithography, chemical etching, laser etching, photolithography, and e-beam lithography. In the case of nanoimprint lithography, the nanoimprint lithography process utilizes a stamp which imprints the spin on glass or sol gel material with a desired topography, which is followed by curing the material used to fabricate the second layer.

Referring again to FIG. 2D, processing includes coating the exposed first surface 30 of the laminated cell or on an exposed surface of the second (e.g., waveguide) layer 34, if applied, to provide a coating layer comprising a desirable material, for example a material having a high refractive index. Generally, as used herein, a "high refractive index" is a refractive index of greater than about 2.2. The refractive index of the second layer may range from about 2.0 to about 3.0. In some examples, the second layer has a refractive index of about 2.5. Metal oxide materials are selected for utilization as the high refractive index material. One example of a metal oxide includes a TiO2 material. In some examples, the high refractive index material is directionally deposited on exposed surfaces of the waveguide layer by a physical vapor deposition process.

At operation 310 of FIG. 3, the laminate layer 24 is removed in a delamination step to provide processed (i.e., delaminated) cells. This can be accomplished by any means that will allow for removal of the desired quantity without damaging the carrier substrate or the processed cells, including dissolving laminate layer 24 with a solvent that is known to be a good solvent for the material of which the laminate layer is formed. Examples of such solvents include various aliphatic solvents, hexane, heptane, ethyl acetate, acetone, methanol, ethanol, isopropanol, 1,4-dioxane, tetrahydrofuran, 1-methoxy-2-propanol, 2-acetoxy-1-methoxypropane, acetonitrile, methyl ethyl ketone, cyclohexanone, toluene, dimethyl sulfoxide, N,N-dimethylformamide, N,N-dimethylacetamide, N-methyl-2-pyrrolidinone, N-ethyl-2-pyrrolidinone, chloroform, methylene chloride, anisole, xylene, and fluorocarbon solvents.

Where an edge bond has been formed, the processed cells can be separated by first mechanically disrupting or destroying the continuity of the edge bond using laser ablation, plasma etching, water jetting, or other high energy techniques that effectively etch or decompose the edge bond. It is also suitable to first saw or cut through the edge bond or cleave the edge bond by some equivalent means. Regardless of which of the above means is utilized, a low mechanical force (e.g., finger pressure, gentle wedging) may be sufficient to separate the singulated treated cells from the carrier substrate.

At operation 312 of FIG. 3, after delamination the processed cells can undergo secondary processing. For example, the cells may be bonded. Various bonding techniques may be used, such as direct bonding, anodic bonding, and adhesive bonding, among others. In some applications, direct bonding is preferred. In direct bonding, the adhesion between two surfaces occurs as a result of chemical bonds established between molecules from the two surfaces. Typically, the adhesion is weak at room temperature (mediated by Van der Waals forces) and maximum bond strength is reached by transforming the weak bonds into covalent bonds through a high temperature thermal annealing.

In some examples, cells are bonded using adhesives. SU-8, a 3-component UV-sensitive negative photo-resist adhesive based on epoxy resin, gamma butyrolactone and triaryl sulfonium salt, is suitable.

In some examples, cells may be joined using anodic bonding where the cells comprises a high content of alkali oxides. The bond occurs when the two wafers are heated after being brought in contact and an electric field is applied. At a certain temperature, depending on the glass composition, oxides dissociate and alkali ions are driven by the electric field into the glass, creating an oxygen rich layer at the silicon-glass interface.

In accordance with various examples, the processed cells produced by the methods described herein are used in an eyewear electronic device.

Except as stated above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some examples, "substantially similar" may denote values within about 10% of each other, such as within about 5% of each other, or within about 2% of each other.

The word "exemplary" is used herein to mean "serving as an example, instance, or illustration". Any example or design described herein as "exemplary" is not necessarily to be construed as preferred or advantageous over other examples or designs.

The terms "at least one" and "one or more" may be understood to include any integer number greater than or equal to one, i.e. one, two, three, four, etc.

The term "a plurality" may be understood to include any integer number greater than or equal to two, i.e. two, three, four, five, etc.

The word "over", used herein to describe forming a feature, e.g. a layer, "over" a side or surface, may be used to mean that the feature, e.g. the layer, may be formed "directly on", e.g. in direct contact with, the implied side or surface. The word "over", used herein to describe forming a feature, e.g. a layer, "over" a side or surface, may be used to mean that the feature, e.g. the layer, may be formed "indirectly on"

the implied side or surface with one or more additional layers being arranged between the implied side or surface and the formed layer.

The term "connection" may include both an indirect "connection" and a direct "connection".

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A waveguide module fabrication method, comprising:
providing an optically transparent substrate having first and second substantially planar parallel surfaces and comprising one or more cells in a predetermined first arrangement;
singulating the substrate to produce one or more singulated cells, wherein the one or more singulated cells are separated from the substrate to form one or more singulated cells free from other cells or the substrate;
immersing the one or more singulated cells in a strengthening agent to produce one or more treated cells, wherein the surfaces of each singulated cell of the one or more treated cells is treated with the strengthening agent;
releasably laminating the one or more treated cells to predetermined sites on a surface of a carrier substrate to provide one or more laminated cells, wherein the predetermined sites correspond to the first arrangement;
processing the one or more laminated cells; and
delaminating the one or more laminated cells from the carrier substrate to provide one or more delaminated processed cells.

2. The method of claim 1, wherein the optically transparent substrate comprises alumina, BK7, borosilicate, ceramic, copper, fused silica, gallium arsenide, gallium phosphide, germanium, glass-ceramic, indium phosphide, lithium niobate, polyethylene, Pyrex, quartz (fused silica), quartz (single crystal), sapphire, silicon, silicon carbide, silicon germanium, silicon on insulator, silicon on sapphire, or a combination thereof.

3. The method of claim 1, wherein a cell is a defined area of the first surface.

4. The method of claim 1, wherein the step of singulating is performed using one or more of the following techniques: saw-with-blade, laser, stealth-laser, and plasma.

5. The method of claim 1, wherein the agent is a chemical agent and the one or more treated cells has an average difference of MOR, KHN, Young's Modulus, or DOL of at least 0.3% than an equal number of untreated cells.

6. The method of claim 1, wherein the agent increases the average modulus of rupture, shear modulus, or Knoop Hardness Number (KHN) of a sample of treated cells compared to an equivalent sample of cells untreated with the agent.

7. The method of claim 6, wherein the sample comprises at least one batch.

8. The method of claim 7, wherein the sample comprises five or more batches.

9. The method of claim 8, wherein a batch comprises at least 10 treated cells.

10. The method of claim 1, wherein the step of processing comprises imprinting or coating.

11. The method of claim 1, wherein the step of processing includes chemical etching, laser etching, photolithography, e-beam lithography, or nanoimprint lithography.

12. The method of claim 1, wherein the step of processing includes coating a treated cell to provide a second layer.

13. A method of manufacturing an optical waveguide, the method comprising the steps of:
providing an optically transparent substrate having first and second substantially planar parallel surfaces and comprising one or more cells in a predetermined first arrangement;
singulating the optically transparent substrate to produce one or more singulated cells, wherein the one or more singulated cells are separated from the substrate to form one or more singulated cells free from other cells or the substrate;
immersing the one or more singulated cells in a strengthening agent to produce one or more treated cells, wherein the surfaces of each singulated cell of the one or more treated cells is treated with the strengthening agent;
releasably laminating the one or more treated cells to predetermined sites on a surface of a carrier substrate to provide one or more laminated cells, wherein the predetermined sites correspond to the first arrangement;
processing the one or more laminated cells;
delaminating cells from the carrier substrate to provide one or more delaminated processed cells; and
performing secondary processing of the one or more delaminated processed cells.

14. The method of claim 13, wherein the agent increases the average modulus of rupture, shear modulus, or Knoop Hardness Number (KHN) of a sample of treated cells compared to an equivalent sample of cells untreated with the agent.

15. The method of claim 14, wherein the sample comprises at least one batch.

16. The method of claim 15, wherein a batch comprises at least 10 treated cells.

17. The method of claim 13, wherein the step of processing comprises one or more of imprinting and coating.

18. A waveguide module produced by a method comprising the steps of:
providing an optically transparent substrate having first and second substantially planar parallel surfaces and comprising one or more cells in a predetermined first arrangement;
singulating the optically transparent substrate to produce one or more singulated cells, wherein the one or more singulated cells are separated from the substrate to form one or more singulated cells free from other cells or the substrate;

immersing the one or more singulated cells in a strengthening agent to produce one or more treated cells, wherein the surfaces of each singulated cell of the one or more treated cells is treated with the strengthening agent;

releasably laminating the one or more treated cells to predetermined sites on a surface of a carrier substrate to provide one or more laminated cells, wherein the predetermined sites correspond to the first arrangement;

processing the one or more laminated cells;

delaminating the one or more laminated cells from the carrier substrate to provide one or more delaminated processed cells; and performing secondary processing of the one or more delaminated processed cells to provide a waveguide module.

19. An eyewear electronic device comprising the waveguide module of claim 18.

* * * * *